(12) United States Patent
Yu (10) Patent No.: US 10,884,539 B2
(45) Date of Patent: Jan. 5, 2021

(54) ELECTRONIC DEVICE AND CONTROL METHOD THEREOF

(71) Applicant: CANON KABUSHIKI KAISHA, Tokyo (JP)

(72) Inventor: Fei Yu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 16/149,596

(22) Filed: Oct. 2, 2018

(65) Prior Publication Data

US 2019/0114024 A1 Apr. 18, 2019

(30) Foreign Application Priority Data

Oct. 12, 2017 (JP) ................. 2017-198652

(51) Int. Cl.
*G06F 3/041* (2006.01)
*G06F 3/044* (2006.01)
*H04N 5/232* (2006.01)
*G06F 3/0488* (2013.01)

(52) U.S. Cl.
CPC ............ *G06F 3/0416* (2013.01); *G06F 3/044* (2013.01); *G06F 3/0414* (2013.01); *G06F 3/0488* (2013.01); *H04N 5/232* (2013.01)

(58) Field of Classification Search
CPC ...... G06F 3/0416; G06F 3/0488; G06F 3/044; G06F 3/0414; H04N 5/232; H04N 5/232939; H04N 5/23216
See application file for complete search history.

(56) References Cited

U.S. PATENT DOCUMENTS

| 8,648,816 | B2* | 2/2014 | Homma | G06F 3/044 345/173 |
| 9,360,962 | B2* | 6/2016 | Sudo | H04N 5/23293 |
| 9,891,738 | B2* | 2/2018 | Huppi | G06F 3/0416 |
| 2006/0022955 | A1* | 2/2006 | Kennedy | G06F 3/04883 345/173 |
| 2006/0181520 | A1* | 8/2006 | Ikegawa | G06F 3/0416 345/173 |
| 2009/0066663 | A1* | 3/2009 | Chang | G06F 3/0412 345/173 |

(Continued)

FOREIGN PATENT DOCUMENTS

JP 2012-118825 A 6/2012
JP 2015-99555 A 5/2015

*Primary Examiner* — Amy Onyekaba
(74) *Attorney, Agent, or Firm* — Canon U.S.A., Inc. IP Division (57) ABSTRACT

An electronic device includes a touch detection unit that detects a touch operation executed on an operation surface, a pressure detection unit that detects a pressing force of the touch operation, and a control unit that controls executing a different function based on the detected pressing force of the touch operation when the touch operation is detected by the touch detection unit. In a case where a touch operation is detected again within a predetermined period from a previous touch operation after the control unit has controlled a function based on the pressing force to be executed based on the touch operation, the control unit controls a same function as the function executed based on the previous touch operation to be executed regardless of the pressing force.

20 Claims, 10 Drawing Sheets

(56) References Cited

U.S. PATENT DOCUMENTS

| | | | |
|---|---|---|---|
| 2009/0231293 A1* | 9/2009 | Nakayama | G06F 3/04886 345/173 |
| 2009/0322793 A1* | 12/2009 | Tsuiki | G06F 3/0485 345/684 |
| 2010/0017710 A1* | 1/2010 | Kim | G06F 3/0488 715/702 |
| 2010/0101872 A1* | 4/2010 | Ikeda | G11B 27/005 178/18.01 |
| 2010/0128002 A1* | 5/2010 | Stacy | G06F 3/044 345/174 |
| 2010/0134312 A1* | 6/2010 | Park | G06F 3/038 340/689 |
| 2010/0225604 A1* | 9/2010 | Homma | G06F 3/044 345/173 |
| 2011/0057957 A1* | 3/2011 | Kasahara | G06F 3/04886 345/684 |
| 2011/0167391 A1* | 7/2011 | Momeyer | G06F 3/038 715/863 |
| 2011/0187750 A1* | 8/2011 | Ko | G09G 5/00 345/661 |
| 2011/0201301 A1* | 8/2011 | Okada | G06F 3/0416 455/404.1 |
| 2011/0310058 A1* | 12/2011 | Yamada | G06F 3/0414 345/174 |
| 2012/0011456 A1* | 1/2012 | Noda | H04N 21/4223 715/769 |
| 2012/0044172 A1* | 2/2012 | Ohki | G06F 3/0485 345/173 |
| 2012/0139856 A1* | 6/2012 | Ise | G06F 3/04883 345/173 |
| 2012/0147052 A1* | 6/2012 | Homma | G06F 3/04886 345/660 |
| 2013/0063389 A1* | 3/2013 | Moore | G06F 3/0414 345/174 |
| 2013/0120306 A1* | 5/2013 | Furukawa | G06F 3/041 345/173 |
| 2013/0127765 A1* | 5/2013 | Behdasht | G06F 3/044 345/173 |
| 2013/0181932 A1* | 7/2013 | Shinozaki | G06F 3/04842 345/173 |
| 2014/0006985 A1* | 1/2014 | Matsushima | G06F 3/0488 715/765 |
| 2014/0078370 A1* | 3/2014 | Yoshimi | H04N 1/00416 348/333.01 |
| 2014/0139471 A1* | 5/2014 | Matsuki | G06F 3/041 345/173 |
| 2014/0139472 A1* | 5/2014 | Takenaka | G06F 3/0416 345/173 |
| 2014/0184867 A1* | 7/2014 | Sudo | G06F 3/0488 348/333.01 |
| 2014/0253482 A1* | 9/2014 | Toyoura | G06F 3/04186 345/173 |
| 2014/0258923 A1* | 9/2014 | Kim | G06F 3/04845 715/799 |
| 2014/0300569 A1* | 10/2014 | Matsuki | G06F 3/0488 345/173 |
| 2014/0333831 A1* | 11/2014 | Oh | H04M 1/67 348/376 |
| 2014/0347296 A1* | 11/2014 | Yoshikawa | G06F 3/041 345/173 |
| 2015/0067519 A1* | 3/2015 | Missig | G06F 3/016 715/732 |
| 2015/0160729 A1* | 6/2015 | Nakagawa | G06T 11/60 345/173 |
| 2015/0192997 A1* | 7/2015 | Nakagawa | G06T 11/001 345/174 |
| 2015/0192998 A1* | 7/2015 | Ishimaru | G06F 3/0488 345/174 |
| 2015/0265190 A1* | 9/2015 | Ikebe | A61B 5/681 600/316 |
| 2015/0277564 A1* | 10/2015 | Saito | G06F 3/0485 715/702 |
| 2015/0331394 A1* | 11/2015 | Jang | G04G 21/04 368/281 |
| 2015/0370385 A1* | 12/2015 | Yamaguchi | G06F 3/04186 345/174 |
| 2015/0371608 A1* | 12/2015 | Yamaguchi | G06F 3/044 345/174 |
| 2016/0011643 A1* | 1/2016 | Tokutake | G06F 1/3218 345/173 |
| 2016/0034131 A1* | 2/2016 | Kosaka | G06F 3/0486 715/765 |
| 2016/0062530 A1* | 3/2016 | Huppi | G06F 3/0412 345/177 |
| 2016/0065838 A1* | 3/2016 | Chen | G06F 3/0412 348/333.02 |
| 2016/0070402 A1* | 3/2016 | Kim | G06F 3/0482 345/173 |
| 2016/0077656 A1* | 3/2016 | Ito | G06F 3/0488 345/173 |
| 2016/0162143 A1* | 6/2016 | Ito | G06F 3/0483 345/173 |
| 2016/0224179 A1* | 8/2016 | Ichihara | G06F 3/0418 |
| 2016/0259458 A1* | 9/2016 | Johansson | G06F 3/0418 |
| 2016/0334911 A1* | 11/2016 | Kimura | G06F 3/0346 |
| 2017/0104921 A1* | 4/2017 | Yoshida | H04N 5/23241 |
| 2017/0104922 A1* | 4/2017 | Matsushima | H04N 5/23216 |
| 2017/0139565 A1* | 5/2017 | Choi | G06F 3/0485 |
| 2017/0155826 A1* | 6/2017 | Nakagawa | H04N 5/23293 |
| 2017/0220113 A1* | 8/2017 | Iino | G06F 3/016 |
| 2017/0228149 A1* | 8/2017 | Tsubakihara | G06F 3/04845 |
| 2017/0264761 A1* | 9/2017 | Kuwahara | H04N 1/23 |
| 2017/0351372 A1* | 12/2017 | Ota | G06F 16/9038 |
| 2019/0114022 A1* | 4/2019 | Kim | G06F 3/0416 |

* cited by examiner

ELECTRONIC DEVICE AND CONTROL METHOD THEREOF

BACKGROUND

Field

The present disclosure relates to an electronic device and a control method thereof.

Description of the Related Art

In recent years, a touch panel with a pressure sensor has been used for operating an electronic device. The touch panel can execute a different function based on a pressing force. For example, a different operation target is allocated to a corresponding pressing force, and an operation target can be selected from among a plurality of operation targets in one operation.

A display apparatus discussed in Japanese Patent Application Laid-Open No. 2012-118825 subdivides operation modes based on a pressing amount indicating a degree of a pressing force applied to a touch panel, and allocates each of the operation modes to a process associated therewith in advance.

An image display apparatus discussed in Japanese Patent Application Laid-Open No. 2015-99555 scrolls a part of an image displayed on a display unit based on a first operation, and if an operation executed on an operation surface is a second operation different from the first operation, scrolls the entire image displayed on the display unit based on the second operation.

In the technique(s) discussed in the above-described patent documents, if a user wants to execute the same processing again after executing the process associated in advance with a pressing amount based on the pressing amount, the user has to execute operation with the same pressing amount, and thereby there is a problem in that the user cannot execute the operation easily.

SUMMARY

The present disclosure is directed to an electronic device that executes the same function by a pressing force different from a previous pressing force when a different function is executed by a corresponding pressing force applied to a touch panel.

According to an aspect of the present disclosure, an electronic device includes a touch detection unit configured to detect a touch operation executed on an operation surface, a pressure detection unit configured to detect a pressing force of the touch operation, and a control unit configured to control, when a touch operation is detected, executing a different function based on the detected pressing force when the touch operation is detected by the touch detection unit, wherein, in a case where a touch operation is detected again before a predetermined period elapses after the control unit has controlled a function based on a pressing force to be executed based on the previous touch operation, the control unit controls a same function as the function executed based on a previous touch operation to be executed regardless of a pressing force of the touch operation.

Further features will become apparent from the following description of exemplary embodiments with reference to the attached drawings.

DESCRIPTION OF THE EMBODIMENTS

Hereinafter, exemplary embodiments will be described with reference to the appended drawings.

In a first exemplary embodiment, an imaging apparatus (hereinafter, referred to as a camera) will be described as an example of the electronic device.

Figure 1:
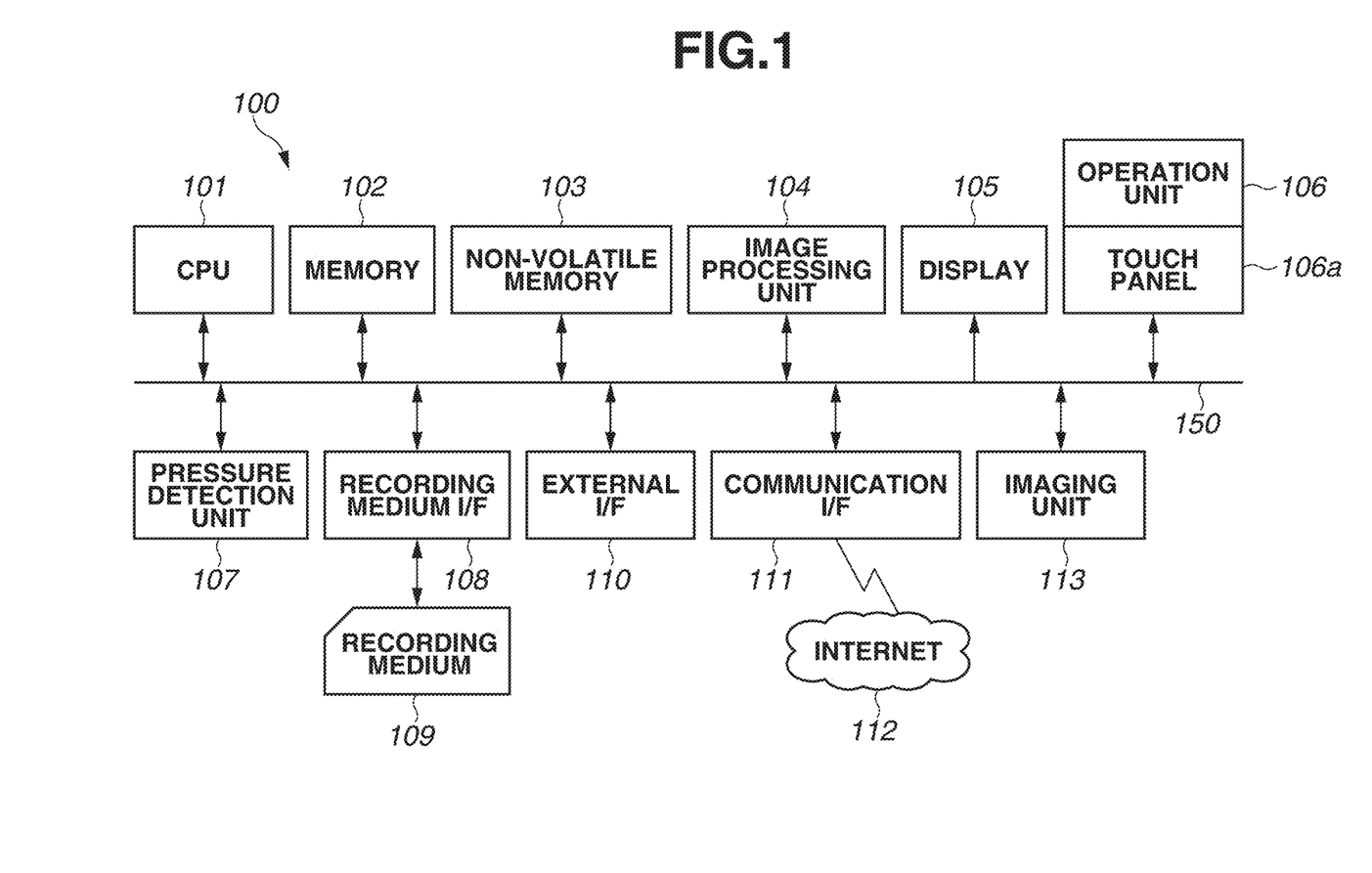
FIG. 1 is a block diagram illustrating a configuration example of a camera.

FIG. 1 is a block diagram illustrating an example of a configuration of a camera 100.

The camera 100 includes a central processing unit (CPU) 101, a memory 102, a non-volatile memory 103, an image processing unit 104, a display 105, an operation unit 106, a pressure detection unit 107, a recording medium interface (I/F) 108, an external I/F 110, a communication I/F 111, and an imaging unit 113. The units of the camera 100 are connected to each other via an internal bus 150 and can mutually exchange data.

The CPU 101 controls the units of the camera 100. The CPU 101 corresponds to one example of a control unit.

The memory 102 is used as a work memory of the CPU 101. The memory 102 is a volatile memory such as a random access memory (RAM). The CPU 101 controls the units of the camera 100, for example, by loading a program stored in the non-volatile memory 103 to the memory 102 and executing the program.

The non-volatile memory 103 stores image data, audio data, and other data as well as various programs executed by the CPU 101. The non-volatile memory 103 can be, for example, a hard disk (HD) and/or a read only memory (ROM).

According to the control by the CPU 101, the image processing unit 104 executes image processing on image data captured by the imaging unit 113, image data stored in the non-volatile memory 103 and the recording medium 109, and image data acquired through the external I/F 110 or the communication I/F 111. The image processing unit 104 executes image processing, such as analog-to-digital (A/D) conversion processing, digital-to-analog (D/A) conversion processing, coding processing of image data, compression processing, decoding processing, enlargement and reduction (resizing) processing, noise reduction processing, and color conversion processing. The image processing unit 104 can also be constituted of a circuit block dedicated for executing specific image processing. Depending on a type of the image processing, the CPU 101 can execute a program for executing the image processing without using the image processing unit 104.

According to the control executed by the CPU 101, the display 105 displays an image and a graphical user interface (GUI) screen. The CPU 101 generates a display control signal according to the program and controls the units of the camera 100 to generate a video signal for displaying an image on the display 105 and output the video signal to the display 105. The display 105 displays an image based on the image data.

The camera 100 includes an interface for outputting image data to be displayed on the display 105. The display 105 can be an external monitor such as a television.

The operation unit 106 is an input device including a button, a dial, a joystick, a touch sensor, and a touch pad for accepting a user operation. As a part of the operation unit 106, the camera 100 includes a touch panel 106a that detects a touch on an operation surface. The touch panel 106a can be configured integrally with the display 105. For example, the touch panel 106a can be formed so that light transmittance of the touch panel 106a does not interfere with display of the display 105, and the touch panel 106a is attached to an upper layer of a display surface of the display 105. Then, an input coordinate of the touch panel 106a is associated with a display coordinate of the display unit 105. With this configuration, it is possible to provide a GUI that enables a user to execute operation as if the user is directly operating a screen displayed on the display unit 105. The touch panel 106a corresponds to one example of a touch detection unit. The touch panel 106a can be an input device that is formed in a planar state and is overlapped with the display 105 and that outputs coordinate information based on a touched position. The touch panel 106a can also be a single device separate from the display 105.

The pressure detection unit 107 detects a pressing force applied to an operation surface of the touch panel 106a. The pressure detection unit 107 corresponds to one example of a pressure detection unit. The pressure detection unit 107 can consecutively detect intensity of the pressing force applied when the operation surface is pressed by a touch operation. For example, a strain gauge sensor or a capacitance sensor can be used as the pressure detection unit 107. When the strain gauge sensor is used, the strain gauge sensor is arranged to a portion to be strained by the pressing force applied to the operation surface, and the pressing force applied to the operation surface is detected by an output value from the strain gauge sensor. When the capacitance sensor is used, the capacitance sensor is arranged in parallel to the operation surface. When the operation surface is strained due to the pressing force applied thereto, a distance between a finger, for example, placed on the operation surface and the capacitance sensor is calculated from a capacitance value, and the pressing force can be detected based on the calculated distance or the pressing force can be detected by treating the calculated distance the same as pressure. In addition, a device of another system can also be used as the pressure detection unit 107 as long as a pressing force applied to the operation surface can be detected thereby. The pressure detection unit 107 can also be configured integrally with the touch panel 106a.

The recording medium 109, such as a memory card, a compact disk (CD), or a digital versatile disk (DVD), is attached to the recording medium I/F 108. Based on control executed by the CPU 101, the recording medium I/F 108 reads data from and writes data to the recording medium 109 attached thereto.

The external I/F 110 connects to an external device via a wired cable or a wireless connection to input and output image data and audio data.

The communication I/F 111 communicates with an external device, the Internet 112, and the like to transmit and receive various data, such as a file or a command.

The imaging unit 113 transmits captured image data to the image processing unit 104. The imaging unit 113 changes a setting value of a setting item related to imaging based on a touch operation executed by the user via the touch panel 106a, and captures an object image. The imaging unit 113 includes a lens and an image sensor.

If the touch panel 106a is included in the operation unit 106, the CPU 101 can detect the following operations executed on the touch panel 106a and states thereof.

- A state where a finger or a stylus pen that has not touched the touch panel 106a newly touches the touch panel 106a, i.e., a start of a touch (hereinafter, referred to as Touch-Down).
- A state where a finger or a stylus pen is touching the touch panel 106a (hereinafter, referred to as Touch-On).
- A state where a finger or a stylus pen is touching and pushing the touch panel 106a (hereinafter, referred to as Touch-Push).
- A state where a finger or a stylus pen is touching and moving on the touch panel 106a (hereinafter, referred to as Touch-Move or Slide).
- A state where a finger or a stylus pen that has been touching the touch panel 106a is removed from the touch panel, i.e., an end of the touch (hereinafter, referred to as Touch-Up).
- A state where neither a finger nor a stylus pen touches the touch panel 106a (hereinafter, referred to as Touch-Off).

When Touch-Down is detected, Touch-On is detected simultaneously. After the Touch-Down, normally, Touch-On continues to be detected unless Touch-Up is detected. Touch-Move is also detected in a state where the Touch-On is detected. Even if Touch-On is detected, Touch-Move is not detected unless the touch position is moved. After detection of Touch-Up of a finger or a stylus pen that has been touching the touch panel 106a, the touch panel 106a enters a Touch-Off state.

The CPU 101 is notified of the above-described operations, states, and a position coordinate at which a finger or a stylus pen touches the touch panel 106a from the touch panel 106a via the internal bus 150. The CPU 101 determines a type of operation executed on the touch panel 106a based on the notified information. The CPU 101 can determine a moving direction of the finger or the stylus pen moving on the touch panel 106a during Touch-Move for each of vertical and horizontal components on the touch panel 106a based on a change of the position coordinate. When the user executes Touch-Down on the touch panel 106a and Touch-Up after executing a certain period of Touch-Move, it is referred to as drawing a stroke. An operation of quickly drawing the stroke is referred to as Flick. The Flick is an operation of quickly moving a finger or the stylus pen for a certain distance while touching the touch panel 106a and then removing the finger or stylus pen from the touch panel 106a thereafter. In other words, the Flick is an operation of flipping the touch panel 106a with the finger or stylus pen. The CPU 101 determines that the Flick is executed when Touch-Move of a predetermined distance or more at a predetermined speed or higher is detected and Touch-UP is detected. When Touch-Move of a predetermined distance or more at a predetermined speed or less is detected, the CPU 101 determines that Drag is executed. When the pressing force detected by the pressure detection unit 107 has a value larger than or equal to a predetermined threshold value, the CPU 101 determines that a three-dimensional (3D) touch is executed.

A touch panel of any one of a resistive film type, an electrostatic capacitance type, a surface acoustic wave type, an infrared type, an electromagnetic induction type, an image recognition type, or an optical sensor type can be used as the touch panel 106a. Any detection method, such as a method of detecting a touch when a finger or a stylus pen is in contact with the touch panel 106a or a method of detecting a touch when a finger or a stylus pen is moved close to the touch panel 106a, can be used.

Figure 2:
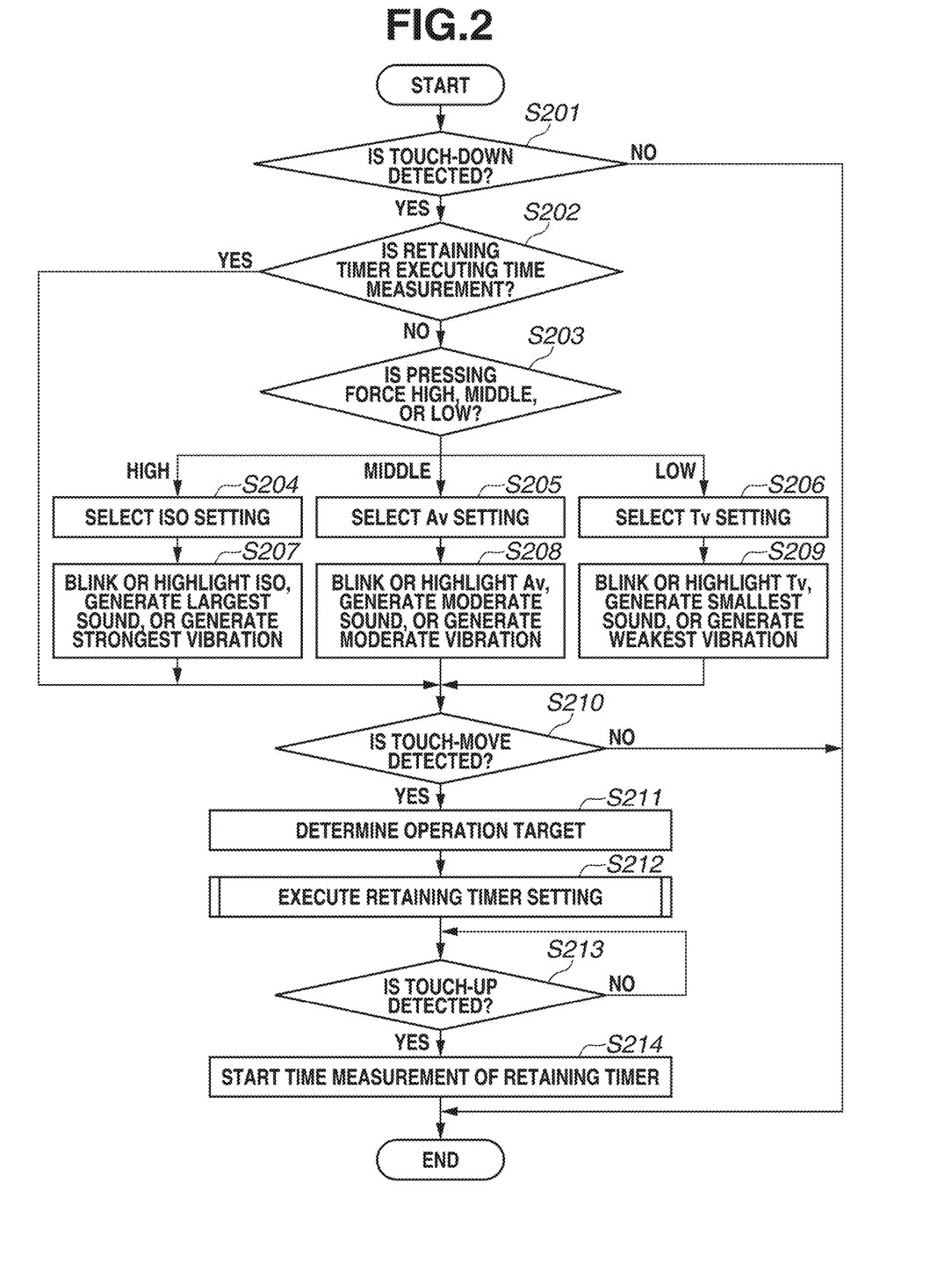
FIG. 2 is a flowchart illustrating processing executed by a camera according to a first exemplary embodiment.

An example of processing executed by the camera 100 according to the present exemplary embodiment will now be described with reference to the flowchart in FIG. 2. The CPU 101 loads a program stored in the non-volatile memory 103 to the memory 102 to execute the program so that the flowchart in FIG. 2 is achieved. The flowchart in FIG. 2 is periodically executed by enabling the touch panel 106a of the operation unit 106.

In step S201, the CPU 101 determines whether Touch-Down is executed on the operation surface of the touch panel 106a. If the Touch-Down is executed (YES in step S201), the processing proceeds to step S202. If the Touch-Down is not executed (NO in step S201), the processing in the flowchart ends.

In step S202, the CPU 101 determines whether a retaining timer is executing time measurement. The retaining timer is a timer that starts the time measurement in step S214 described below. The retaining timer ends the time measurement when a value of the retaining timer becomes 0. The value of the retaining timer at that time corresponds to one example of a predetermined period. If the retaining timer is not executing time measurement (NO in step S202), the processing proceeds to step S203. If the retaining timer is executing the time measurement (YES in step S202), i.e., if the predetermine period is not elapsed, the processing proceeds to step S210. A description will be provided of the case where the processing proceeds to step S203 because the time measurement by the retaining timer is not yet started and the retaining timer is not executing the time measurement (NO in step S202).

In step S203, the CPU 101 determines a pressing force of a touch applied to the operation surface of the touch panel 106a via the pressure detection unit 107. In the present exemplary embodiment, the pressing force of the touch is sorted into high, middle, and low. More specifically, the pressure detection unit 107 detects the pressing force applied thereto when the user executes Touch-Down in step S201, and the CPU 101 acquires information about the pressing force from the pressure detection unit 107. For example, the CPU 101 sorts the pressing force into high if a value thereof is a first threshold value or larger, sorts the pressing force into middle if a value thereof is less than the first threshold value and greater than or equal to a second threshold value, and sorts the pressing force into low if a value thereof is less than the second threshold value. In addition, information about the first and the second threshold values is stored in, for example, the non-volatile memory 103.

If the pressing force is high (HIGH in step S203), the processing proceeds to step S204. If the pressing force is middle (MIDDLE in step S203), the processing proceeds to step S205. If the pressing force is low (LOW in step S203), the processing proceeds to step S206. The user can execute a different function based on the pressing force of the touch operation. In the present exemplary embodiment, the user can select a different setting item based on the pressing force of Touch-Down to change a setting value of the setting item selected through Touch-Move.

In the present exemplary embodiment, the setting item related to imaging will be described as an example of the setting item.

More specifically, if the pressing force is high (HIGH in step S203) and the processing proceeds to step S204, the CPU 101 selects "ISO (International Organization for Standardization)" as the setting item, and the processing proceeds to step S207. If the pressing force is middle (MIDDLE in step S203) and the processing proceeds to step S205, the CPU 101 selects "Av (aperture)" as the setting item, and the processing proceeds to step S208. If the pressing force is low (LOW in step S203) and the processing proceeds to step S206, the CPU 101 selects "Tv (shutter speed)" as the setting item, and the processing proceeds to step S209.

In steps S207, S208, and S209, the CPU 101 notifies the user of the selected setting item in a recognizable manner via display, sound, or vibration.

In step S207, for example, the CPU 101 blinks or highlights a notation relating to ISO to display the setting item to be recognizable from the other setting items. For example, the CPU 101 can generate sound that is the largest of three levels or can generate vibration that is the strongest of three levels. Then, the processing proceeds to step S210.

In step S208, for example, the CPU 101 blinks or highlights a notation relating to Av to display the setting item in a display mode different from that of the other setting items. For example, the CPU 101 can generate sound that is moderate of the three levels or can generate vibration that is moderate of the three levels. Then, the processing proceeds to step S210.

In step S209, for example, the CPU 101 blinks or highlights a notation relating to Tv to display the setting item in a display mode different from that of the other setting items. For example, the CPU 101 can generate sound that is the smallest of the three levels or can generate vibration that is the weakest of the three levels. Then, the processing proceeds to step S210.

Figure 4A:
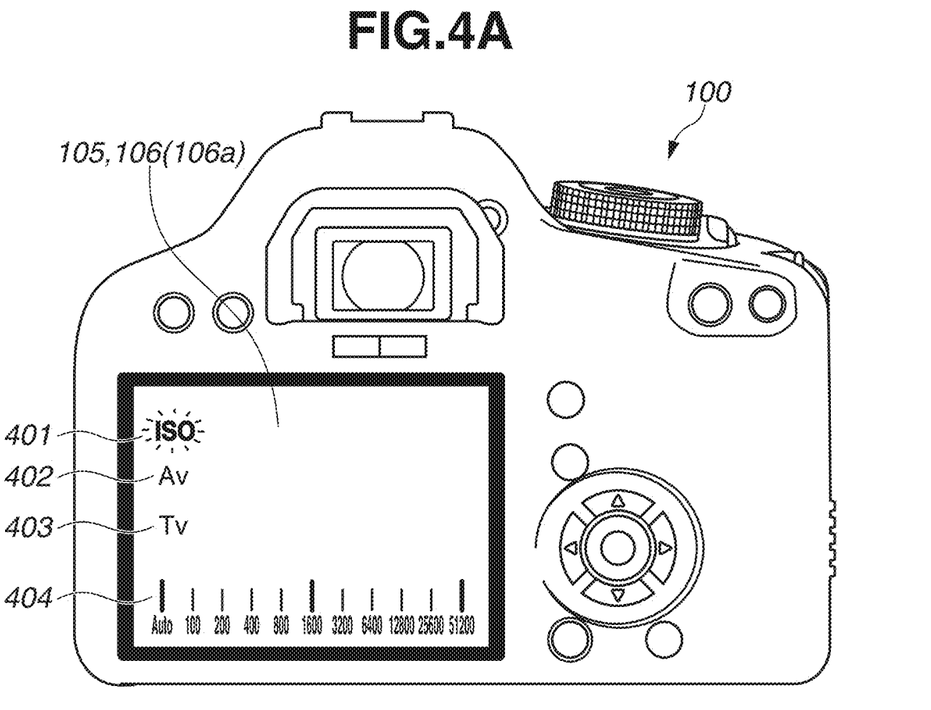
FIGS. 4A and 4B are diagrams illustrating a display example of a display.

Herein, a display example of a highlighted notation relating to the setting item will be described with reference to FIG. 4A. As illustrated in FIG. 4A, for example, when Touch-Down is executed with a pressing force of high, a notation 401 of "ISO" is highlighted. Because notations 402 and 403 of "Av" and "Tv", respectively, are not highlighted, the user can recognize that the setting item of "ISO" is selected. In FIG. 4A, a display item 404 for changing the setting value of ISO is displayed in a part (lower side) of the display 105.

Next, an example of a configuration for generating vibration will be described with reference to FIGS. 5 and 6.

Figure 5:
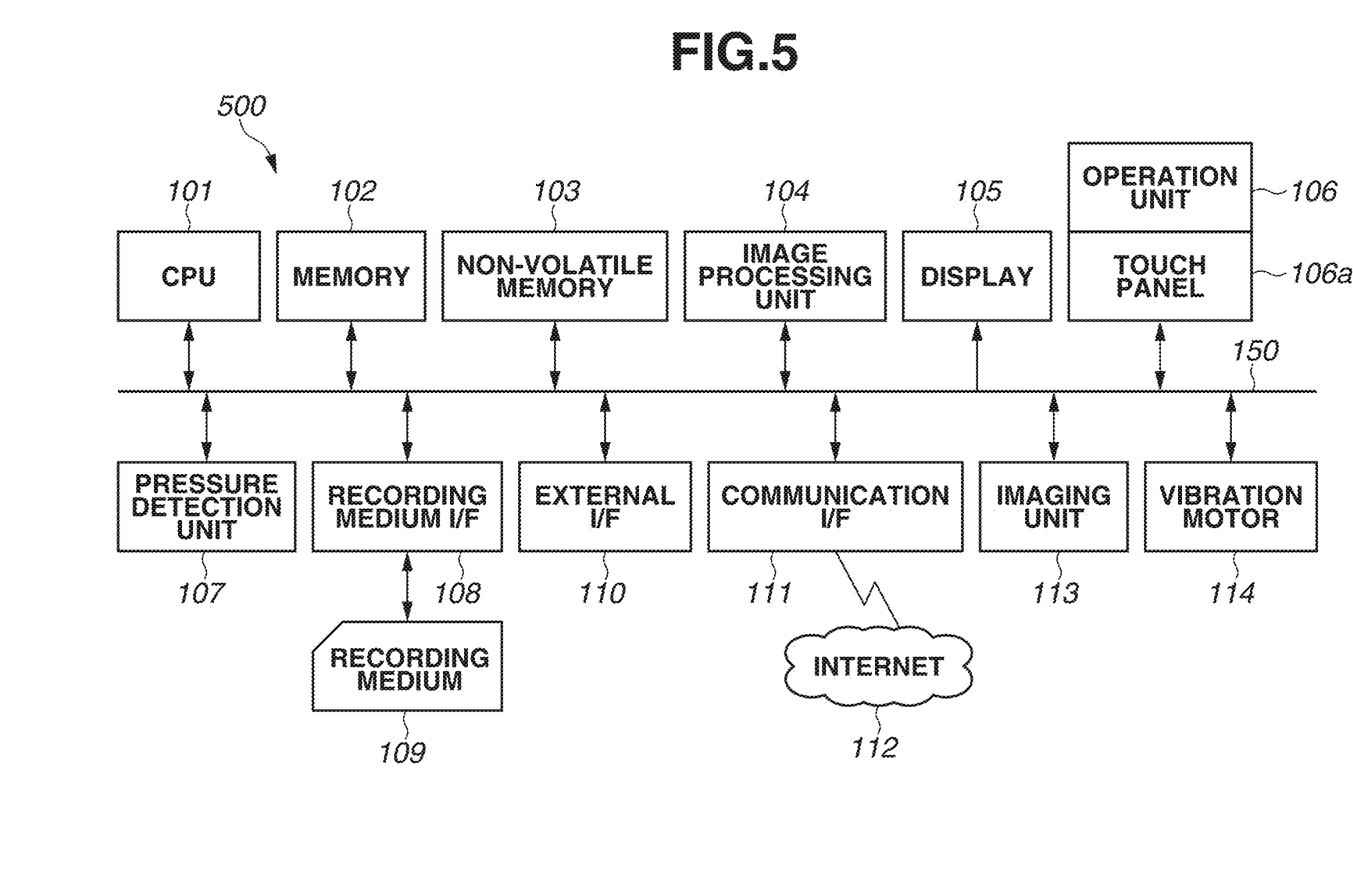
FIG. 5 is a block diagram illustrating another configuration example of a camera.

FIG. 5 is a block diagram illustrating an example of a configuration of a camera 500 appropriate for generating vibration. Herein, the camera 500 includes a vibration motor 114 in addition to the configuration of the camera 100 in FIG. 1.

Figure 6:
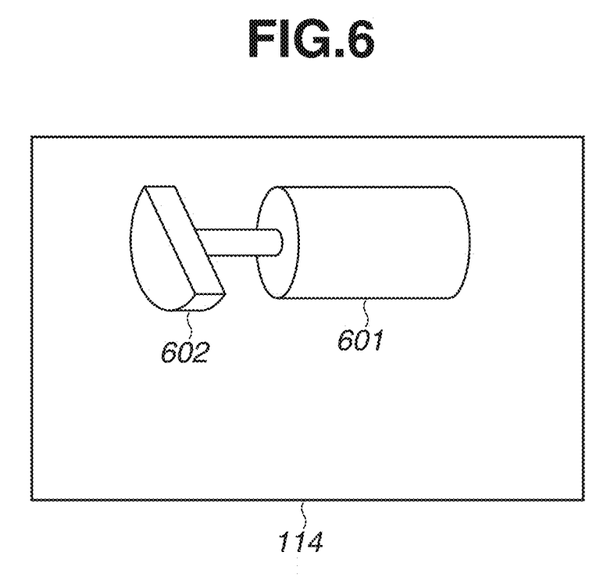
FIG. 6 is a diagram illustrating a configuration example of a vibration motor.

FIG. 6 is a diagram illustrating an example of a configuration of the vibration motor 114.

The vibration motor 114 includes a direct-current motor 601 and a weight 602. The direct-current motor 601 rotates the weight 602 when a direct voltage is applied thereto. A center of gravity of the weight 602 is shifted from the center of an output shaft of the direct-current motor 601. Accordingly, vibration is generated when the weight 602 is rotated. This vibration provides stimulus to the user through a hand that touches the operation surface of the touch panel 106a.

As described above, feedback about selection of the setting item is provided to the user using at least one of display, sound, or vibration, so that the user can recognize which of the setting items is selected. In addition, when the feedback about selection of the setting item is to be provided to the user through display, a display method is not limited to blinking or highlighting, but any intensified display method can be used as long as the selection of the setting item is recognizable.

Referring back to the flowchart in FIG. 2, in step S210, the CPU 101 determines whether Touch-Move (Slide) is detected without detecting Touch-Up after Touch-Down is detected in step S201. If the Touch-Move is detected (YES in step S210), the processing proceeds to step S211. At this time, the CPU 101 acquires information about a moving amount (sliding amount) of Touch-Move from the touch panel 106a. If the Touch-Move is not detected (NO in step S210), it is assumed that the user has no intention of changing the setting value, and the flowchart ends. In addition, it is preferable that the processing return to step S203 if neither Touch-Move nor Touch-Up is detected. In this case, because the CPU 101 advances the processing to any one of steps S204 to S206 by determining the pressing force of the touch again, the user can select a different setting value by changing the pressing force. In steps S207, S208, and S209, the user can recognize the setting item selected through at least display, sound, or vibration by changing the pressing force.

In step S211, the CPU 101 determines a setting item to be an operation target. More specifically, the CPU 101 determines information about the setting item selected in any one of steps S204 to S206 as the setting item to be the operation target. Herein, the CPU 101 stores information about the determined setting item in the memory 102. Accordingly, for example, if the user selects an ISO value in step S204 and executes Touch-Move in a state where the notation relating to the ISO is highlighted in step S205, the ISO is determined as a setting item to be the operation target. Then, the processing proceeds to step S212.

In step S212, the CPU 101 executes retaining timer setting processing for setting the retaining timer. Two methods of the retaining timer setting processing illustrated in flowcharts in FIGS. 3A and 3B will be described.

Figure 3A:
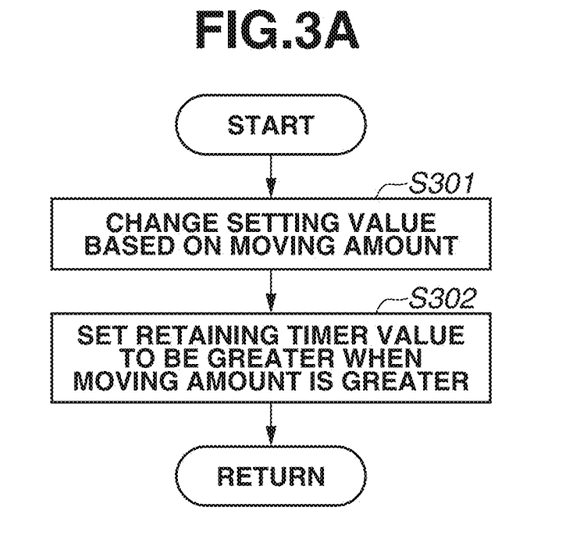
FIGS. 3A and 3B are flowcharts illustrating processing for setting a retaining timer.

First, the flowchart in FIG. 3A will be described.

In step S301, the CPU 101 changes a setting value of the setting item based on the moving amount of the Touch-Move acquired in step S210. The CPU 101 can execute processing of actually changing the setting value after determining Touch-Up in step S213 described below. In this case, the CPU 101 recognizably displays, to the user, a setting value that is changed based on the moving amount of Touch-Move.

Figure 4B:
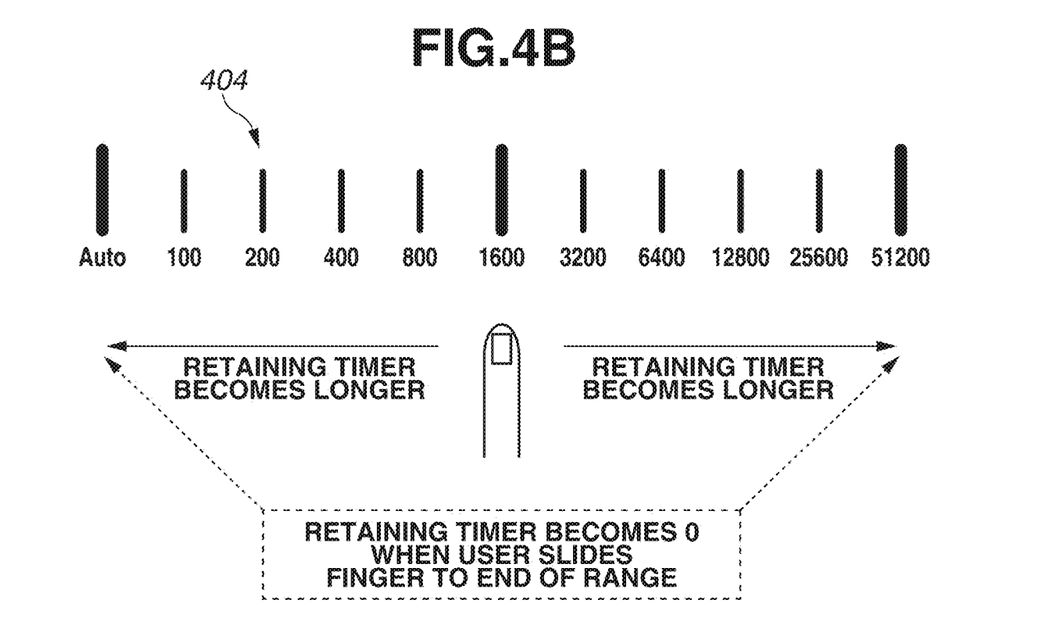

FIG. 4B is a diagram illustrating a state where the setting value is changed based on the moving amount. FIG. 4B illustrates a setting value and scale marks as a display item 404 illustrated in FIG. 4A. As illustrated in FIG. 4B, a setting value of the ISO increases as a moving amount of Touch-Move is greater toward the right, and a setting value thereof decreases as the moving amount thereof is greater toward the left.

In step S302, the CPU 101 sets a value of the retaining timer based on the moving amount. Herein, a value of the retaining timer is set to be greater when the moving amount is greater because there is a high possibility that the user sets the setting value again as the moving amount is greater. A value of the retaining timer based on the moving amount is stored in the non-volatile memory 103, for example.

Figure 3B:
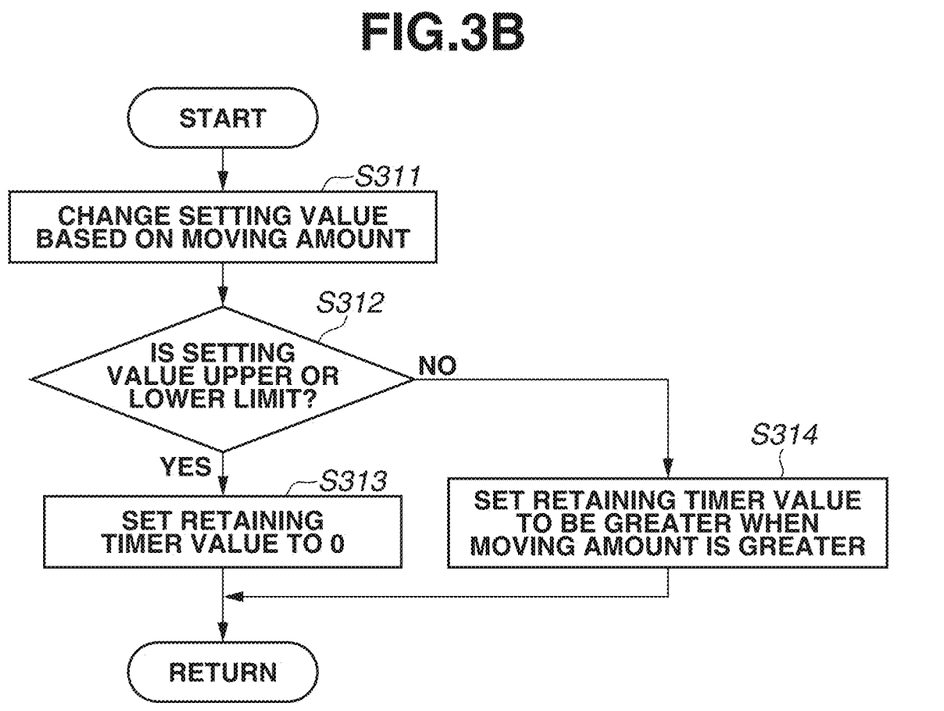

Next, a flowchart illustrated in FIG. 3B will be described.

In step S311, the CPU 101 changes a setting value of the setting item based on the moving amount of the Touch-Move acquired in step S210. This processing is similar to the processing described in step S301.

In step S312, the CPU 101 determines whether the setting value changed in step S311 is either an upper limit or a lower limit, i.e., an end of the setting range. If the changed setting value is either the upper limit or the lower limit (YES in step S312), the processing proceeds to step S313. If the changed setting value is neither the upper limit nor the lower limit (NO in step S312), the processing proceeds to step S314. The upper limit of the setting value of the ISO illustrated in FIG. 4B is "51200", and the lower limit thereof is "Auto". Therefore, the processing proceeds to step S313 if the setting value is changed to either "51200" or "Auto". Herein, although a description has been given of the case where the upper limit is "51200" and the lower limit is "Auto", the exemplary embodiment is not limited thereto. For example, the upper limit can be "Auto" and the lower limit can be a numerical value, such as 100, or both the upper and the lower limits can be numerical values, such as 51200 and 100.

In step S313, the CPU 101 sets a value of the retaining timer to 0. Herein, if the changed setting value is either the upper limit or the lower limit, the value of the retaining timer is set to 0 because there is a low possibility that the user sets the setting value again.

In step S314, the CPU 101 sets a value of the retaining timer based on the moving amount. This processing is similar to the processing described in step S302.

In addition, in a case where Auto is set as the setting value, the user does not have to manually change the setting value because the setting value is automatically changed by the CPU 101. Therefore, the CPU 101 eliminates a setting item set to Auto from the setting item changeable based on the pressing force. The CPU 101 can newly add a setting item changeable based on the pressing force. The CPU 101 can determine whether to add a setting item or determine a setting item to be added based on selection by the user.

Figure 7:
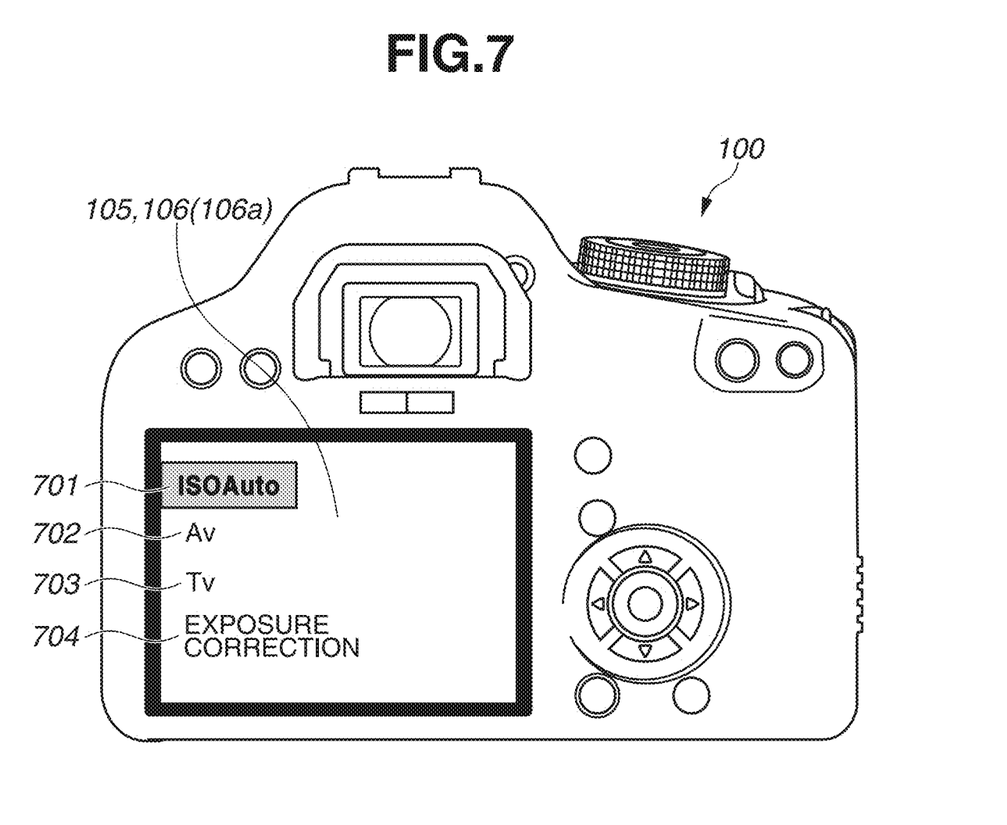
FIG. 7 is a diagram illustrating a display example of a display.

FIG. 7 is a diagram illustrating an example of a display in a case where a setting item is added.

As illustrated in FIG. 7, if the setting value of the ISO from among the setting items is set to Auto, a notation 701 relating to the ISO value is displayed in a grayed out state so that the user can recognize that the setting value cannot be changed based on the pressing force. A notation 704 relating to "EXPOSURE CORRECTION" is newly added as a setting item changeable based on the pressing force. As described above, the CPU 101 changes the setting item to be an operation target based on a setting state so that the user can easily change the setting value based on the pressing force. In addition, the CPU 101 can change the setting item to be an operation target based on a mode (e.g., a still image capturing mode, a moving image capturing mode, or a reproduction mode) set by the user.

Referring back to the flowchart in FIG. 2, in step S213, the CPU 101 determines whether Touch-Up is detected after the Touch-Move detected in step S210. If the Touch-Up is not detected (NO in step S213), the CPU 101 waits for the Touch-Up. The processing can return to step S212 if the Touch-Up is not detected. If the Touch-Up is detected (YES in step S213), the processing proceeds to step S214.

In step S214, the CPU 101 starts time measurement of the retaining timer. More specifically, the CPU 101 starts counting down the value of the retaining timer set in step S212 to execute time measurement until the value thereof becomes 0. In other words, the time measurement ends when the value of the retaining timer becomes 0. Herein, the CPU 101 retains the setting item to be the operation target determined in step S211 until the value of the retaining timer becomes 0. In step S214, the time measurement of the retaining timer can be started after the CPU 101 has actually changed the setting value.

Next, a case where the CPU 101 ends the processing in step S214 and periodically starts the flowchart in FIG. 2 is described.

In this case, in step S201, the CPU 101 determines whether Touch-Down is executed on the operation surface of the touch panel 106*a*, and proceeds the processing to step S202 when the Touch-Down is executed again.

In step S202, the CPU 101 determines whether the retaining timer that started the time measurement in step S214 is executing the time measurement. If the retaining timer is 0 and is not executing the time measurement, i.e., if a predetermined period has elapsed, the processing proceeds to step S203. In step S203, as described above, the CPU 101 determines a pressing force of the Touch-Down applied to the operation surface of the touch panel 106*a* via the pressure detection unit 107, selects a different setting item based on the pressing force of the Touch-Down, and changes a setting value of the setting item selected through Touch-Move.

If the retaining timer is not 0 and is executing time measurement, i.e., if the predetermined period has not elapsed, the processing proceeds to step S210. In step S210, the CPU 101 determines whether Touch-Move is detected, and the processing proceeds to step S211 if the Touch-Move is detected.

In step S211, the CPU 101 determines the setting item determined in previous step S211 as a setting item to be the operation target. In other words, the CPU 101 reads information about the setting item from the memory 102 and determines the read setting item as the setting item to be the operation target. Then, the processing proceeds to step S212.

Accordingly, because the processing does not proceed to steps S203 to S209 while the retaining timer is executing the time measurement, the setting item determined previously becomes the setting item to be the operation target regardless of the pressing force. In addition, in a case where the retaining timer is executing the time measurement, the CPU 101 displays the setting items to enable the user to recognize that the same setting item as the setting item before executing Touch-Up will be the setting item to be the operation target. For example, the CPU 101 can continue the blinking or highlighting display of the notification executed in steps S207 to S209 in the previous processing of the flowchart until the retaining timer ends the time measurement, so that the setting item to be the operation target can be displayed to the user in a recognizable manner. Accordingly, the user can easily recognize the setting item to be the operation target even after the Touch-Up has been executed. If the retaining timer is ended, the CPU 101 displays the setting items to enable the user to recognize that the same setting item as the setting item before executing the Touch-Up does not become the setting item as an operation target. For example, the CPU 101 cancels the blinking or highlighting display that has been continuously executed in steps S207 to S209 of the previous processing of the flowchart.

In the present exemplary embodiment, in a case where a touch operation is detected again within a predetermined period from a previous touch operation after the CPU 101 controls a function corresponding to a pressing force to be executed based on the previous touch operation, the CPU 101 executes a same function as the function executed based on the previous touch operation regardless of the pressing force. Accordingly, for example, in a case where the user has changed the setting value of the setting item based on the pressing force of the touch operation and desires to change the setting value of the same setting item again, the setting value can be changed even if the user executes a touch operation with a pressing force different from the previous pressing force. As described above, the user can easily change the setting value.

In the present exemplary embodiment, the CPU 101 selects a function to be executed based on a pressing force of a first Touch-Down on the operation surface, and executes the selected function via Touch-Move executed after the Touch-Down. In a case where Touch-Move is detected again after a second Touch-Down, the CPU 101 executes a same function as the function executed via the previous Touch-Move within a predetermined period from execution of Touch-Up regardless of the pressing force of the second Touch-Down. As described above, it is possible to suppress a function from being erroneously selected through touch operations executed in two steps.

In the above-described exemplary embodiment, the retaining timer is started after the function based on the pressing force is executed and then Touch-Up is executed, but the exemplary embodiment is not limited thereto. For example, the retaining timer can be started after Touch-Up is executed to execute the function based on the pressing force. The same can be said for the following exemplary embodiment.

Figure 8:
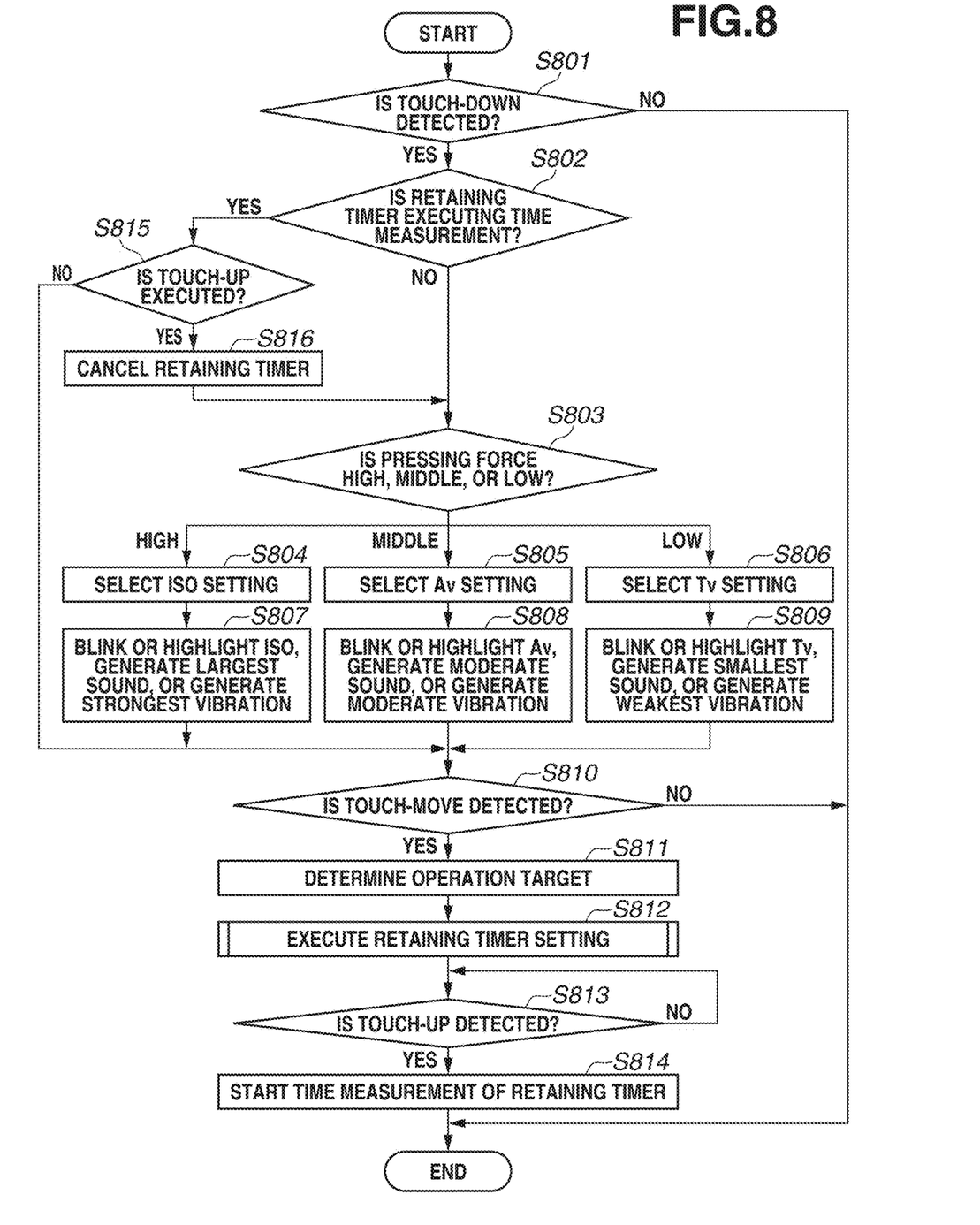
FIG. 8 is a flowchart illustrating processing executed by a camera according to a second exemplary embodiment.

A second exemplary embodiment will be described with reference to the flowchart in FIG. 8. In the present exemplary embodiment, processing of cancelling time measurement of the retaining timer halfway through is added to the processing described in the first exemplary embodiment, so that a user can execute a function based on a pressing force without having to wait for the time measurement of the retaining timer to be ended. In the flowchart of FIG. 8, processing in steps S801 to S814 is similar to the processing in steps S201 to S214 in the flowchart of FIG. 2, so that descriptions thereof are omitted as appropriate. Herein, the processing to be executed when the retaining timer is executing the time measurement will be described.

In step S802, if the retaining timer is executing the time measurement (YES in step S802), the processing proceeds to step S815.

In step S815, the CPU 101 determines whether Touch-Up is executed after Touch-Down on the operation surface in step S801. If the Touch-Up is not executed (NO in step S815), the processing proceeds to step S810. When the processing proceeds to step S810, similar to the first exemplary embodiment, the CPU 101 determines the setting item determined in previous step S811 as a setting item to be the operation target if Touch-Move is executed. If the Touch-Up is executed (YES in step S815), the processing proceeds to step S816. Herein, the Touch-Up in step S815 executed after the Touch-Down in step S801 is a cancellation operation of the retaining timer executed by the user, and this operation corresponds to one example of a specific operation.

In step S816, the CPU 101 ends the time measurement of the retaining timer (i.e., sets a value of the retaining timer to 0) to cancel the retaining timer, and the processing proceeds to step S803. Accordingly, in step S803 and subsequent steps, similar to step S803 in the previous processing, the CPU 101 can determine the pressing force of the Touch-Down on the operation surface of the touch panel 106*a* via the pressure detection unit 107 to select the setting item that the user desires to change based on the pressing force.

In the present exemplary embodiment, even if a touch operation is detected again within a predetermined period from a previous touch operation, if the user executes the specific operation, the CPU 101 controls a function corresponding to the pressing force to be executed based on that touch operation even within the predetermined period. Accordingly, for example, if the user wants to change a setting value of the setting item different from the previous setting item within a predetermined period after a setting value of the previous setting item has been changed based on the pressing force of the touch operation, the user can change the setting value of that different setting item based on the pressing force of the touch operation by executing the cancellation operation. In other words, the user can change a setting value of a desired setting item without having to wait for the predetermined period, so that operability of the user can be improved.

In the present exemplary embodiment, the cancellation operation in which Touch-Down is shifted to Touch-Up is described as a specific operation. However, the specific operation is not limited thereto. The specific operation can be an operation of a specific button, a touch executed with a pressing force allocated to cancellation operation, a touch on an area of the display 105 where a display item is not displayed, a touch executed for a certain period of time (i.e., long-time pressing), or a combination of these operations.

Figure 9:
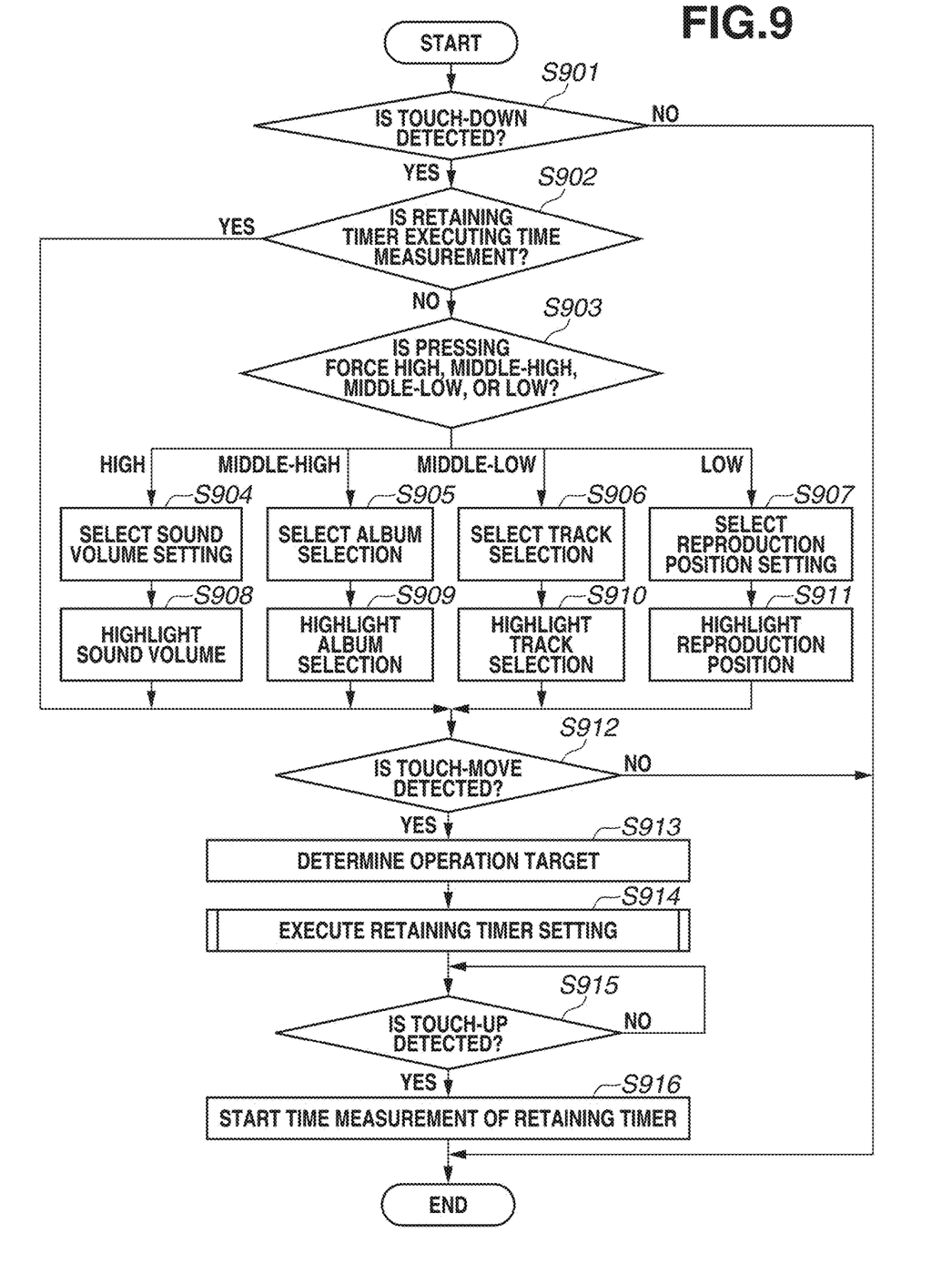
FIG. 9 is a flowchart illustrating processing executed by a smartphone according to a third exemplary embodiment.

A third exemplary embodiment will be described with reference to a flowchart in FIG. 9. In the above-described exemplary embodiments, the setting item selected based on the pressing force is the setting item relating to imaging. In the present exemplary embodiment, a description is provided of a case where a setting item to be selected is a setting item relating to music, such as sound volume, album selection, track selection, or a reproduction position. In the present exemplary embodiment, a smartphone 1000 is described as the electronic device. A configuration of the smartphone 1000 is similar to that of the camera 100 in FIG. 1 and the camera 500 in FIG. 5, so that descriptions thereof will be omitted. The processing in steps S901 and S902 and steps S912 to S916 of the flowchart in FIG. 9 is similar to the processing in steps S201 and S202 and steps S210 to S214 of the flowchart in FIG. 2, so that descriptions thereof will be omitted as appropriate.

In step S903, the CPU 101 determines a pressing force of a touch on the operation surface of the touch panel 106a via the pressure detection unit 107. In the present exemplary embodiment, the pressing force of the touch is sorted into high, middle-high, middle-low, and low. For example, the pressing force is sorted into high if a value thereof is a first threshold value or above, sorted into middle-high if a value thereof is less than the first threshold value and greater than or equal to a second threshold value, sorted into middle-low if a value thereof is less than the second threshold value and greater than or equal to a third threshold value, and sorted into low if a value thereof is less than the third threshold value. Information about the first, the second, and the third threshold values is stored in the non-volatile memory 103, for example.

If the pressing force is high (HIGH in step S903), the processing proceeds to step S904. If the pressing force is middle-high (MIDDLE-HIGH in step S903), the processing proceeds to step S905. If the pressing force is middle-low (MIDDLE-LOW in step S903), the processing proceeds to step S906. If the pressing force is low (LOW in step S903), the processing proceeds to step S907. In the present exemplary embodiment, the user can select any one of setting items of sound volume, album selection, track selection, or a reproduction position based on the pressing force of the touch.

More specifically, if the pressing force is high (HIGH in step S903), in step S904, the CPU 101 selects a sound volume setting as the setting item, and the processing proceeds to step S908. If the pressing force is middle-high (MIDDLE-HIGH in step S903), in step S905, the CPU 101 selects an album selection as the setting item, and the processing proceeds to step S909. If the pressing force is middle-low (MIDDLE-LOW in step S903), in step S906, the CPU 101 selects a track selection as the setting item, and the processing proceeds to step S910. If the pressing force is low (LOW in step S903), in step S907, the CPU 101 selects a reproduction position as the setting item, and the processing proceeds to step S911.

In steps S908, S909, S910, and S911, the CPU 101 notifies the user of the selected setting item in a recognizable manner. For example, similar to the first exemplary embodiment, the CPU 101 can notify the user of the selected setting item through display, sound, or vibration.

FIGS. 10A to 10D are diagrams illustrating display examples of the display 105 of the smartphone 1000.

Figure 10A:
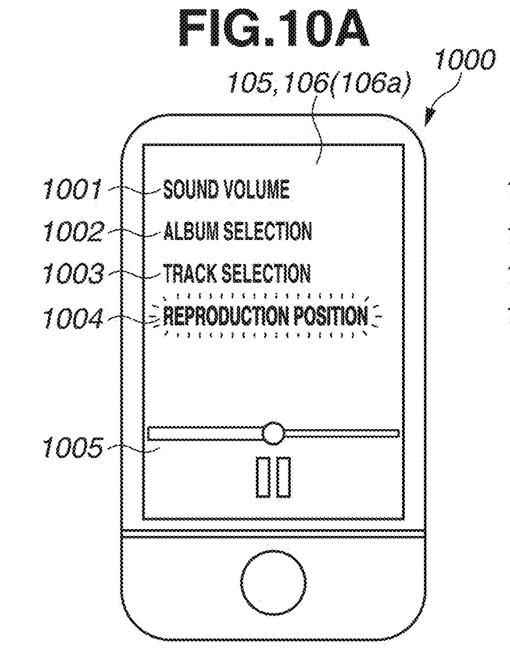
FIGS. 10A, 10B, 10C, and 10D are diagrams illustrating display examples of a display.
Figure 10B:
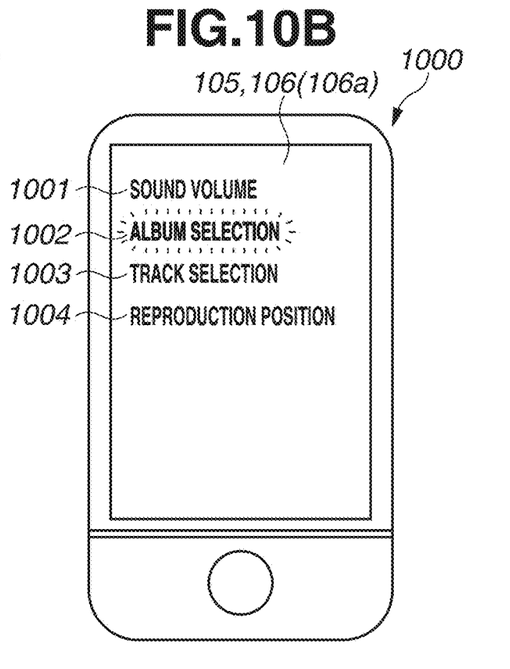

FIG. 10A is a diagram illustrating an example of a display displayed when the user first touches the display 105 with a low pressing force. Herein, a notation 1004 relating to "REPRODUCTION POSITION" is highlighted, and a display item 1005 that enables the user to change a reproduction position through Touch-Move is displayed. Notations 1001, 1002, and 1003 relating to "SOUND VOLUME", "ALBUM SELECTION", and "TRACK SELECTION", respectively, are not highlighted, so that the user can recognize that the setting item of the reproduction position is selected. FIG. 10B is a diagram illustrating an example of a display displayed when the user continuously touches the display 105 with an increased pressing force of middle-high. Herein, the "ALBUM SELECTION" 1002 is highlighted. When the user executes Touch-Move in this state, the album selection is determined as the setting item to be the operation target.

Figure 10C:
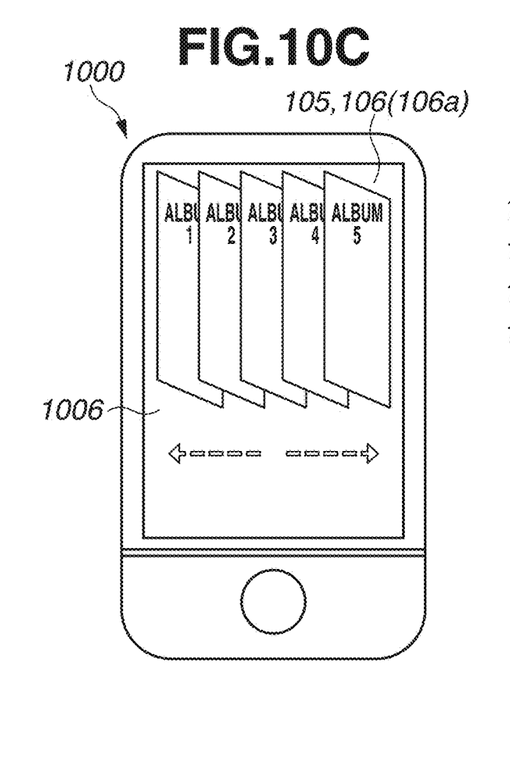

FIG. 10C is a diagram illustrating an example of a display displayed when the album selection is selected and confirmed as the setting item to be the operation target. Herein, a plurality of albums 1006 is displayed in a selectable state.

Figure 10D:
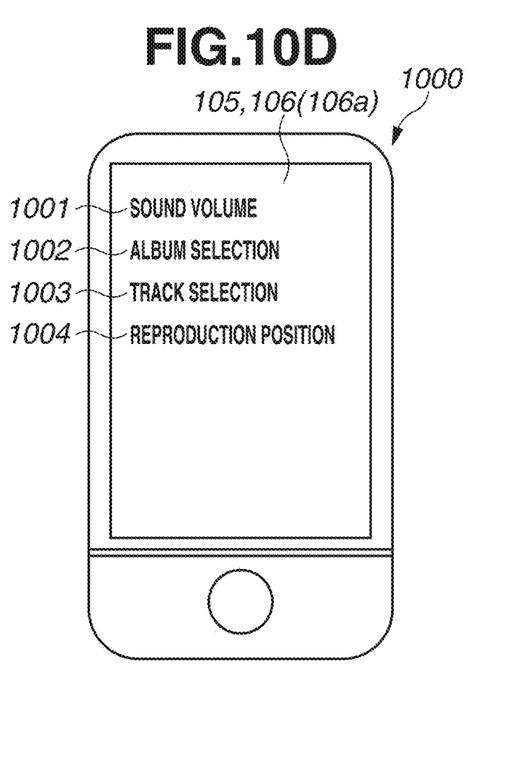

FIG. 10D is a diagram illustrating an example of a display displayed when the retaining timer is ended. The CPU 101 starts the time measurement of the retaining timer when the user selects an album and executes Touch-Up. When the retaining timer becomes 0 and ends the time measurement, the CPU 101 cancels the highlighting display of the notations 1001, 1002, 1003, and 1004 relating to "SOUND VOLUME", "ALBUM SELECTION", "TRACK SELECTION", and "REPRODUCTION POSITION", respectively, to enable the user to recognize that none of these setting items are selected.

As described above, in the present exemplary embodiment, in a case where a touch operation is detected again after the CPU 101 changes the setting value of the setting item relating to music based on the pressing force within a predetermined period, the CPU 101 controls a setting value of the same setting item as the previous setting item to be changed. Accordingly, for example, in a case where the user desires to change the setting value of the same setting item again after the setting value of the setting item relating to music has been changed based on the pressing force of the touch operation, the user can promptly change the setting value even if the touch operation is executed with a pressing force different from the previous pressing force.

In the above-described exemplary embodiments, while the cameras 100 and 500 and the smartphone 1000 are described as examples of the electronic device, the electronic device is not limited thereto. In other words, the present disclosure is applicable to a device that executes a different function based on a pressing force of a touch operation on the operation surface of the touch panel 106a. More specifically, the present disclosure is applicable to at least a personal computer, a tablet terminal, a music player, a printer apparatus, a digital photo frame, a game machine, an electronic book reader, a projection apparatus, an in-vehicle electronic device, a home-use electronic device, or an industrial electronic device.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^T$M), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-198652, filed Oct. 12, 2017, which is hereby incorporated by reference herein in its entirety.

What is claimed is:

1. An electronic device comprising:
a touch detection unit configured to detect a touch operation executed on an operation surface;
a pressure detection unit configured to detect a pressing force of the touch operation; and
a control unit configured to control, when the touch operation is detected, executing a function based on the detected pressing force of the touch operation,
wherein, when the touch operation is detected again before a predetermined period elapses after the control unit has controlled the function corresponding to the pressing force to be executed based on a previous touch operation, the control unit controls executing a same function as the function executed based on the previous touch operation regardless of the pressing force of the touch operation that is detected again before the predetermined period elapses.

2. The electronic device according to claim 1, wherein, when the touch operation is detected again after the predetermined period elapses, the control unit controls executing a function based on the pressing force of the touch operation detected again after the predetermined period elapses.

3. The electronic device according to claim 1, wherein the control unit controls a function corresponding to a pressing force to be executed when a move operation in which a touch position is moved is detected by the touch detection unit.

4. The electronic device according to claim 1, wherein, when a first touch operation is detected by the touch detection unit, the control unit determines a function to be executed based on a pressing force of touch-down executed in the first touch operation and controls the determined function to be executed when execution of a move operation in which a touch position is moved is detected in the first touch operation.

5. The electronic device according to claim 4, wherein, when a second touch operation is detected before the predetermined period elapses after the first touch operation is released from the operation surface, the control unit controls executing the function executed by the first touch operation when a move operation is executed by the second touch operation regardless of the pressing force of the second touch operation.

6. The electronic device according to claim 1, further comprising a notification unit configured to notify a user that the same function as the function executed by the previous touch operation can be executed by executing a touch operation again before the predetermined period elapses.

7. The electronic device according to claim 6, wherein the notification unit ends the notification when the predetermined period elapses.

8. The electronic device according to claim 1, wherein, when a specific operation is executed within the predetermined period, the control unit controls executing the function corresponding to the pressing force of the touch operation even if a touch operation is executed again within the predetermined period.

9. The electronic device according to claim 8, wherein the specific operation is a touch operation without moving a touch position.

10. The electronic device according to claim 1, wherein the control unit controls the predetermined period to be changed based on a moving amount of a touch position moved in the previous touch operation.

11. The electronic device according to claim 1, wherein the control unit controls processing for changing a setting value of a different setting item to be executed based on the pressing force of the touch operation that is detected again before the predetermined period elapses.

12. The electronic device according to claim 11, wherein, when the touch operation is detected by the touch detection unit, the control unit determines a setting item of which a setting value is changed based on the pressing force of touch-down executed in the touch operation, and controls the setting value of the determined setting item to be changed when execution of a move operation in which a touch position that is moved is detected in the touch operation.

13. The electronic device according to claim 12, wherein, when the pressing force of the touch operation is changed without executing the move operation after the touch-down of the touch operation, the control unit determines a setting item of which a setting value is changed based on a changed pressing force.

14. The electronic device according to claim 11 further comprising a display control unit configured to display a plurality of setting items on a display unit,
wherein, when a setting item of which a setting value is changed is determined by the control unit, the display control unit controls the determined setting item to be displayed in a recognizable manner.

15. The electronic device according to claim 14, wherein the display control unit continues display of the determined setting item in a recognizable manner even after the touch operation is released from the operation surface, and ends the display thereof in the recognizable manner when the predetermined period elapses from when the touch operation is released from the operation surface.

16. The electronic device according to claim 11, wherein the control unit changes the predetermined period based on a setting value changed based on the touch operation.

17. The electronic device according to claim 16, wherein the control unit determines the predetermined period based on a change amount of the setting value or the changed setting value.

18. The electronic device according to claim 11, wherein, when a setting value of a setting item is changed to an upper limit value or a lower limit value based on the touch operation, the control unit controls executing a function based on a next pressing force of the touch operation regardless of time elapsed until a next touch operation is detected.

19. A control method of an electronic device comprising:
detecting a touch operation executed on an operation surface;
detecting a pressing force of the touch operation; and
performing control to execute a function based on the detected pressing force of the touch operation,
wherein, when the touch operation is detected again before a predetermined period of time elapses after performing control to execute the function based on the pressing force based on a previous touch operation, control is performed to execute a same function as the function executed based on the previous touch operation regardless of the pressing force of the touch operation that is detected again before the predetermined period elapses.

20. A non-transitory computer-readable storage medium storing a program for causing a computer to execute a control method, the control method comprising:
detecting a touch operation executed on an operation surface;
detecting a pressing force of the touch operation; and
performing control to execute a function based on the detected pressing force of the touch operation,
wherein, when the touch operation is detected again before a predetermined period elapses after performing control to execute the function based on the pressing force based on a previous touch operation, control is performed to execute a same function as the function executed based on the previous touch operation regardless of the pressing force of the touch operation that is detected again before the predetermined period elapses.

* * * * *